Patented Jan. 5, 1954

2,665,283

UNITED STATES PATENT OFFICE 2,665,283

COPOLYMERS

Daniel J. Carlick, Roselle, N. J., assignor to Interchemical Corporation, New York, N. Y., a corporation of Ohio No Drawing. Application September 26, 1951, Serial No. 248,468

4 Claims. (Cl. 260—407)

This invention relates to the field of drying oils, and is particularly directed at the production of modified copolymers of drying oils and styrene, which are freely soluble in aliphatic hydrocarbon solvents.

The copolymerization of drying oils with styrene has been extensively studied in recent years, and such copolymers have been used in substantial quantities in the paint industry; the copolymers, in comparision with bodied oils of the same viscosity, give additional adhesion, gloss, hardness, chemcial and weather resistance, and faster drying. However, because the copolymers, unlike ordinary bodied oils, are not soluble in the cheap aliphatic petroleum hydrocarbons, their use has been limited in paints, and are all but prohibited in printing inks, which in general must be free of materials having marked solvent action on the synthetic rubbers used in printing press distribution systems.

I have discovered that it is possible to copolymerize drying oils with styrene, while obtaining products which are freely soluble in low solvency aliphatic petroleum hydrocarbons, and have all the advantages of ordinary styrenated oils except fast drying—the results are obtained by adding to the reaction mixture a minor percentage of an isoprene, and polymerizing in the presence of an organic oxygen yielding catalyst.

In general, optimum properties are obtained in these copolymers if the oil is kept within the range of 35 to 75% of the copolymer. Below 35% of oil, the copolymers are essentially plasticized polystyrene; they are rubbery in character, and not freely soluble in aliphatics. Above 75% of oil, the effect of the adduct is not sufficiently great to show commercial differences. My best compositions contain between 50 and 60% of oil.

The isoprene should be present in a minimum ratio by weight of 1 to 12 styrene; below this minimum, aliphatic hydrocarbon solubility is lost. Above 1 to 3 styrene, drying is slowed up so that the resultant products are impractical. The optimum ratio is 1 to 6.

Any organic oxygen yielding catalyst may be used for the reaction. Organic peroxides are preferred; the oxygen may be obtained by using drying oils which have been heavily blown; or other organic oxygen yielders may be substituted.

Typical examples are as follows:

Example 1

216 grams styrene (36%)
36 grams isoprene (6%)
132 grams oxidized linseed oil (Z2 to Z3 body Gardner-Holdt)
216 grams alkali refined linseed oil (36%)
4.75 grams di-tertiary butyl peroxide were heated, in a closed system equipped with reflux, to 220° F., where an exothermic reaction set in. Heating was continued for 4½ hours, to reach 400° F., it was held 30 minutes at 400, and vacuum stripped. 563 grams of a light colored oil having a viscosity of 390 poises at 30° C., was obtained. The oil was soluble in aliphatic petroleum hydrocarbon solvents (naphtha) and gave films with improved gloss, adhesion, abrasion resistance and hardness as compared to linseed oil of the same body, drying time was about equal.

Example 2

400 grams styrene
50 grams isoprene
550 grams diamond K soya oil (blown to Z2 viscosity)

were heated in 1 hour to 220° F. where an exothermic reaction started; it was run to 400° F. in 3½ hours, and stripped with $CO_2$. A balsam, soluble in aliphatic petroleum solvents, was obtained in 95.5% yield.

Example 3

360 pounds styrene
60 pounds isoprene
580 pounds dehydrated castor oil
3.6 pounds benzyl peroxide were heated as in the last example. The run lasted 7 hours to 400° F.; the oil was $CO_2$ stripped and filtered. 95% yield of a product of $Z_1$ to $Z_2$ body was obtained.

Obviously, examples can be multiplied indefinitely without departing from the scope of my invention, as defined in the claims. In particular, the reaction is between the styrene, the conjugated double bonds in the isoprene and the doubly unsaturated fatty acids present in the drying oil. It should be noted that the reaction goes with fatty acids, which can (like the oils themselves), be converted into alkyd resins.

My oils are particularly useful in paints and printing inks, and in the production of alkyd resins.

I claim:

1. A modified fatty drying oil soluble in aliphatic hydrocarbon solvents, comprising a copolymer formed in the presence of an organic oxygen yielding catalyst of from 35 to 75% of drying oil and from 65 to 25% of unsaturated hydrocarbons consisting of 1 part of isoprene to from 3 to 12 parts of styrene.

2. A modified fatty drying oil soluble in aliphatic hydrocarbon solvents, comprising a copolymer formed in the presence of an organic oxygen yielding catalyst of from 35 to 75% of drying oil and from 65 to 25% of unsaturated hydrocarbons consisting of 1 part of isoprene to 6 parts of styrene.

3. A modified fatty drying oil soluble in aliphatic hydrocarbon solvents, comprising a copolymer formed in the presence of an organic oxygen yielding catalyst of from 50 to 60% of drying oil and from 50 to 40% of unsaturated hydrocarbons consisting of 1 part of isoprene to 6 parts of styrene.

4. The method of producing a modified fatty drying oil soluble in aliphatic hydrocarbon solvents, which comprises heating 35 to 75% of a drying oil with from 65 to 25% of a mixture of unsaturated hydrocarbons in the presence of an organic peroxide, the mixture consisting of 1 part of isoprene to from 3 to 12 parts styrene, continuing the heating until copolymerization is substantially complete, and stripping off the unreacted unsaturated hydrocarbon.

DANIEL J. CARLICK.

References Cited in the file of this patent

UNITED STATES PATENTS

| Number | Name | Date |
|---|---|---|
| 2,392,710 | Wakeford et al. | Jan. 8, 1946 |
| 2,556,336 | Nye | June 12, 1951 |
| 2,574,753 | Opp et al. | Nov. 13, 1951 |